United States Patent
Kwok et al.

(10) Patent No.: US 9,263,920 B2
(45) Date of Patent: Feb. 16, 2016

(54) PERMANENT MAGNET ROTOR

(71) Applicant: Johnson Electric S.A., Murten (CH)

(72) Inventors: Lo Ching Kwok, Hong Kong (CN); Wai Shing Ip, Hong Kong (CN)

(73) Assignee: Johnson Electric S.A., Murten (CH)

( * ) Notice: Subject to any disclaimer, the term of this patent is extended or adjusted under 35 U.S.C. 154(b) by 404 days.

(21) Appl. No.: 13/727,478

(22) Filed: Dec. 26, 2012

(65) Prior Publication Data

US 2013/0162090 A1    Jun. 27, 2013

(30) Foreign Application Priority Data

Dec. 26, 2011   (CN) .......................... 2011 1 0442361

(51) Int. Cl.
*H02K 1/30* (2006.01)
*H02K 1/27* (2006.01)

(52) U.S. Cl.
CPC . *H02K 1/30* (2013.01); *H02K 1/278* (2013.01)

(58) Field of Classification Search
CPC ............ H02K 1/278; H02K 1/28; H02K 1/30
USPC ............. 310/156.12–156.15, 156.22–156.23, 310/156.54
See application file for complete search history.

(56) References Cited

U.S. PATENT DOCUMENTS

| | | | | |
|---|---|---|---|---|
| 4,591,749 A | * | 5/1986 | Gauthier et al. | 310/156.19 |
| 4,631,435 A | * | 12/1986 | McCarty | H02K 21/46 |
| | | | | 310/156.57 |
| 4,910,861 A | * | 3/1990 | Dohogne | 29/598 |
| 5,323,078 A | * | 6/1994 | Garcia | 310/156.22 |
| 5,923,111 A | * | 7/1999 | Eno et al. | 310/156.25 |
| 6,712,585 B2 | * | 3/2004 | Iehl et al. | 417/42 |
| 2008/0278018 A1 | * | 11/2008 | Achor | 310/156.12 |
| 2009/0001839 A1 | | 1/2009 | Masayuki et al. | |
| 2010/0026124 A1 | * | 2/2010 | Lu | 310/156.12 |

FOREIGN PATENT DOCUMENTS

| | | | | |
|---|---|---|---|---|
| JP | 2004120916 A | * | 4/2004 | H02K 1/27 |
| WO | WO-2010/090303 A1 | | 8/2010 | |

* cited by examiner

*Primary Examiner* — Quyen Leung
*Assistant Examiner* — Eric Johnson
(74) *Attorney, Agent, or Firm* — Muncy, Geissler, Olds & Lowe, P.C.

(57) ABSTRACT

A permanent magnet rotor includes a shaft, a rotor core fixed to the shaft, a bracket fixed to the rotor core, and a plurality of permanent magnets contacting an outer surface of the rotor core. The bracket includes a base at one axial end thereof, a plurality of arms axially extending from the base and spaced in a circumferential direction, and an end ring connecting the arms at the other axial end thereof. The base has an opening for the insertion of the shaft. The rotor core is positioned between the arms. Each magnet is sandwiched between two adjacent arms. An inner diameter of the end ring is greater than an outer diameter of the rotor core.

15 Claims, 3 Drawing Sheets

PERMANENT MAGNET ROTOR

CROSS REFERENCE TO RELATED APPLICATIONS

This non-provisional patent application claims priority under 35 U.S.C. §119(a) from Patent Application No. 201110442361.8 filed in The People's Republic of China on Dec. 26, 2011.

FIELD OF THE INVENTION

This invention relates to a motor rotor and in particular, to a permanent magnet rotor having a magnet bracket.

BACKGROUND OF THE INVENTION

FIG. 6 illustrates a conventional permanent magnet rotor. Permanent magnets 11 of the rotor are fixed to a rotor core 12 by an over mould member 10. The magnets 11 are arcuate in shape, also known as segment magnets. The middle portion of each magnet 11 is thicker than the circumferential ends of the magnet such that the portion 13 of the over mould member 10 covering the middle portion of the magnet 11 is thinner than the portions 14 of the over mould member 10 covering the circumferential ends of the magnet 11. The reliability of the rotor is relatively low as the thinner portion 13 may be broken during rotation of the rotor.

SUMMARY OF THE INVENTION

Hence there is a desire for a more reliable permanent magnet rotor.

The present invention provides a permanent magnet rotor comprising: a shaft; a rotor core fixed to the shaft; a bracket fixed to the rotor core; and a plurality of permanent magnets contacting an outer surface of the rotor core, wherein the bracket comprises a base at one axial end thereof, an end ring at the other axial end thereof, and a plurality of arms axially extending between the base and the end ring and spaced in a circumferential direction, the base has an opening for the insertion of the shaft, the rotor core is positioned between the arms, each magnet is sandwiched between two adjacent arms, and an inner diameter of the end ring is greater than an outer diameter of the rotor core.

Preferably, the bracket is an interference fit with the rotor core.

Preferably, at least one receiving hole is formed at one axial end of the rotor core, and at least one protrusion extends axially from a surface of the base facing the end ring and is arranged within the receiving hole as an interference fit.

Preferably, an annular recess is formed in the surface of the base about the root of the or each protrusion.

Preferably, at least one receptacle, in the form of a slot or hole, is formed in the end ring for receiving material for balancing the rotor.

Preferably, the base is an annular ring coaxial with the rotor core and an outer diameter of the base is equal to an outer diameter of the rotor core.

Preferably, each arm comprises a first portion extending in a radial direction and a pair of second portions circumferentially and oppositely extending from a radially outer end of the first portion, each magnet being circumferentially positioned between the first portions of two adjacent arms and radially positioned between the outer surface of the rotor core and two opposing second portions of the two adjacent arms.

Preferably, the first portion extends radially beyond a radially inner surface of the end ring and is an interference fit with the outer surface of the rotor core.

Preferably, the arms do not extend radially beyond a radially outer surface of the end ring.

Preferably, the permanent magnets are adhered to the outer surface of the rotor core.

Preferably, the permanent magnets are arcuate in shape, a middle portion of each said magnet being thicker than circumferential ends of the magnet.

In the present invention, the rotor can be reliably assembled simply by inserting the rotor core into the bracket and inserting the permanent magnets into the spaces between adjacent arms of the bracket.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
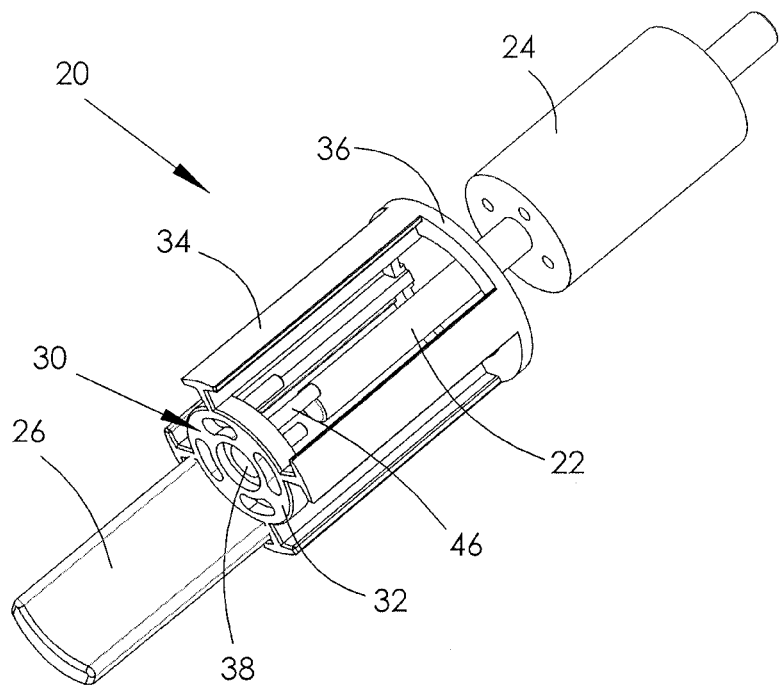
FIG. 1 is an explode view of a permanent magnet rotor in accordance with a preferred embodiment of the present invention.
Figure 2:
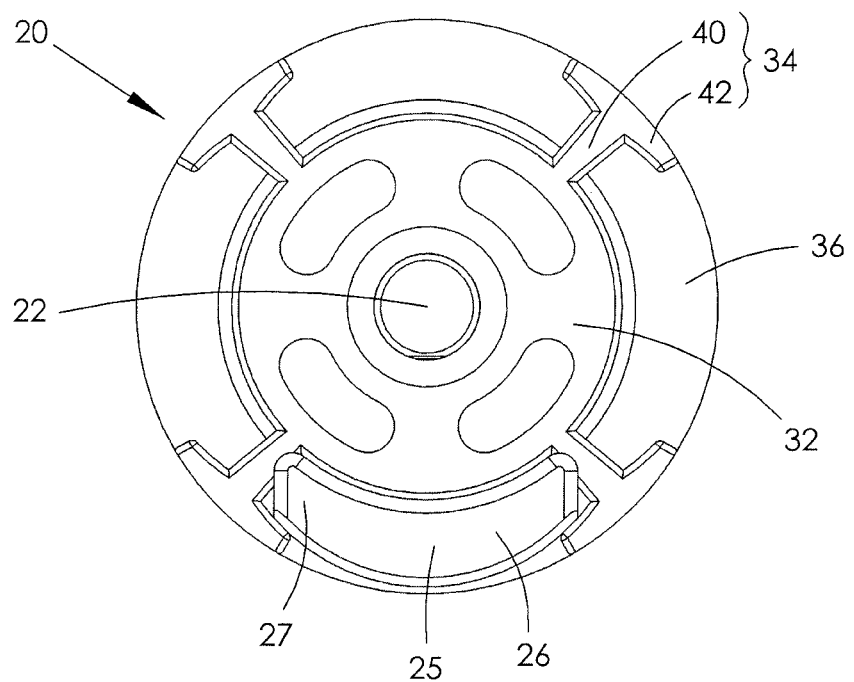
FIG. 2 is a left en view of the rotor of FIG. 1.
Figure 3:
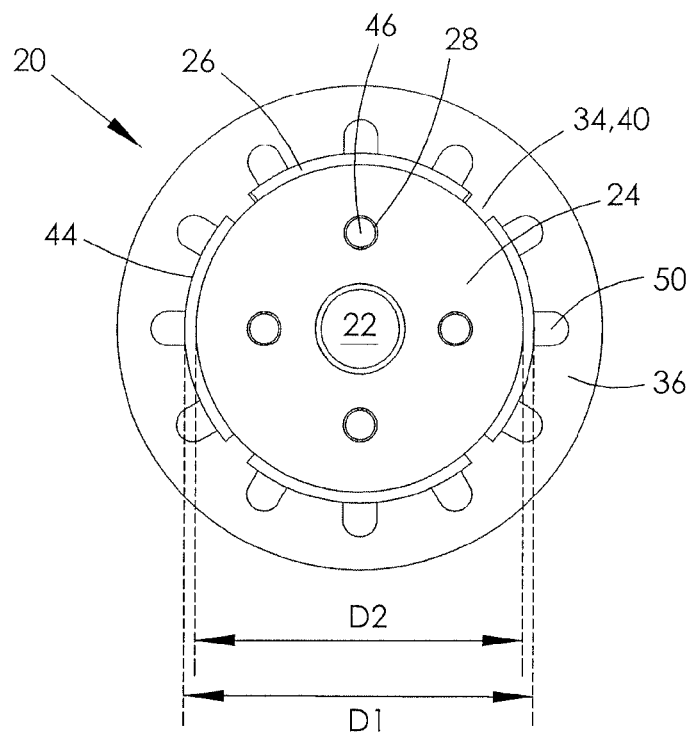
FIG. 3 is a right end view of the rotor of FIG. 1.

FIGS. 1 to 3 illustrate a permanent magnet rotor 20 for an electric motor in accordance with a preferred embodiment of the present invention. The rotor 20 comprises a shaft 22, a rotor core 24 fixed to the shaft 22, a bracket 30 fixed to the rotor core 24, and a plurality of permanent magnets 26 held by the bracket 30 (only one magnet is shown in Figures to more clearly show the structure of the rotor). The rotor core 24 is formed by axially stacking a plurality of rotor laminations. The permanent magnets 26 are arcuate in shape. Preferably, the middle portion 25 of each magnet 26 is thicker than the circumferential ends 27 of the magnet 26 such that cogging torque of the motor can be reduced, which results in a reduction in the vibration and noise produced by the motor.

FIG. 2 is an end view of the assembled rotor when viewed from the left as seen in FIG. 1. One magnet 26 is shown inserted into the gap between adjacent arms of the bracket. The T-shaped structure of the arms 34 is clearly visible. FIG. 3 is a view of the rotor from the right. One magnet 26 can be just seen through the gap between the rotor core 24 and the end ring 36. A plurality of slots 50 are formed in the axial surface of the end ring 36 remote from the base 32. The slots form receptacles for receiving material for balancing the rotor when necessary.

Figure 4:
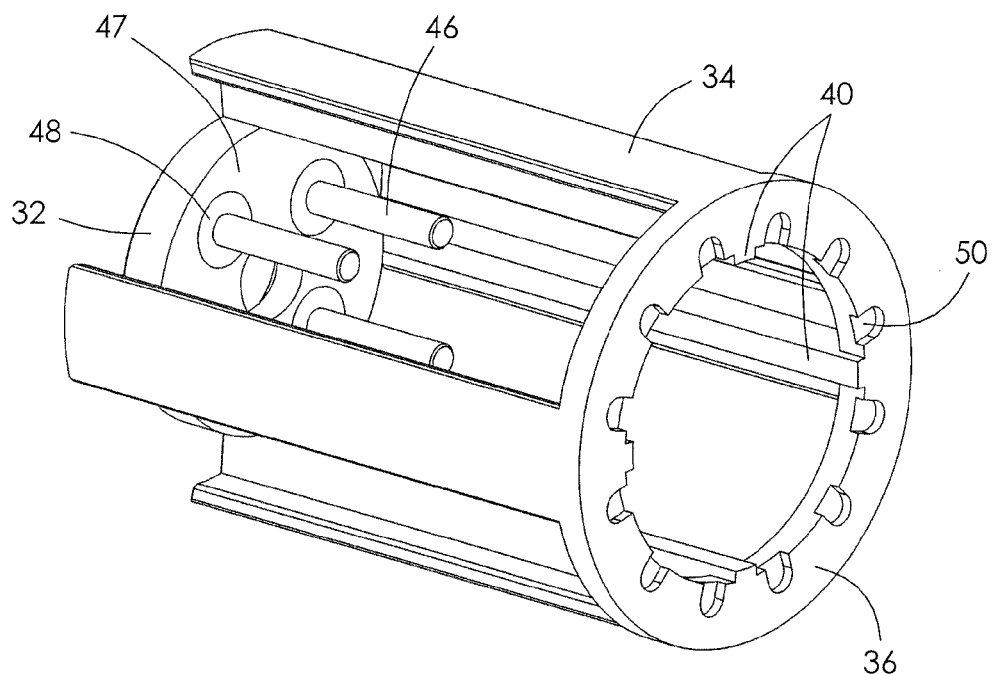
FIG. 4 is a view of a bracket being a part of the rotor of FIG. 1.

Also referring to FIG. 4, the bracket 30 is a plastic monolithic member preferably made by an injection molding process. The bracket 30 comprises a base 32 at one axial end thereof, a plurality of arms 34 axially extending from the radial outer surface of the base 32, and an end ring 36 connecting the arms 34 at the other axial end thereof. The shaft 22 passes through an opening 38 in the base 32. Preferably, the base 32 is an annular ring coaxial with the rotor core 24. The outer diameter of the base 32 is substantially equal to the outer diameter of the rotor core 24. The arms 34 are arranged at regular intervals in the circumferential direction and do not extend beyond the radially outer surface of the end ring 36. Each arm 34 comprises a first portion 40 extending in a radial direction and a pair of second portions 42 circumferentially and oppositely extending from the radially outer end of the first portion 40. Each magnet 26 is circumferentially positioned between the first portions 40 of two adjacent arms 34 and radially positioned between the outer surface of the rotor core 24 and the opposing second portions 42 of the adjacent arms 34. Preferably, the inner surface of each magnet 26 may be adhered to the outer surface of the rotor core 24 to reinforce the connection between them.

In the preferred embodiment, the inner diameter D1 of the end ring 36 is greater than the outer diameter D2 of the rotor core 24. The first portions 40 of the arms 34 extend radially beyond the radially inner surface 44 of the end ring 36 and are an interference fit with the outer surface of the rotor core 24. A plurality of receiving holes 28 are formed in the rotor core 24. A plurality of protrusions 46 axially extending from the axial surface 47 of the base 32 facing the end ring 36 are interference fitted into the receiving holes 28 such that the rotor core 24 is fixed to the bracket 30. The protrusions 46 have a tapered or chamfered distal end to ease alignment with and insertion into the receiving holes 28.

Preferably, a plurality of recesses 48, each extending about the root of a corresponding protrusion 46, are formed on the axial surface 47 of the base 32 for accommodating material scraped from the protrusions 46 during the process of pressing the protrusions 46 into the receiving holes 28 of the rotor core 24.

Figure 5:
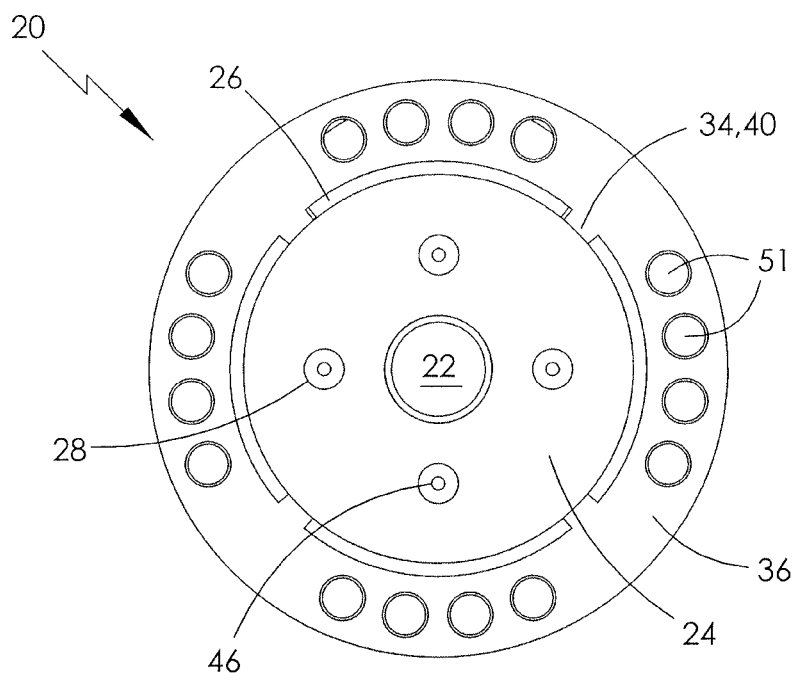
FIG. 5 is a right end view, similar to FIG. 3, of a rotor according to a second embodiment of the present invention.
Figure 6:
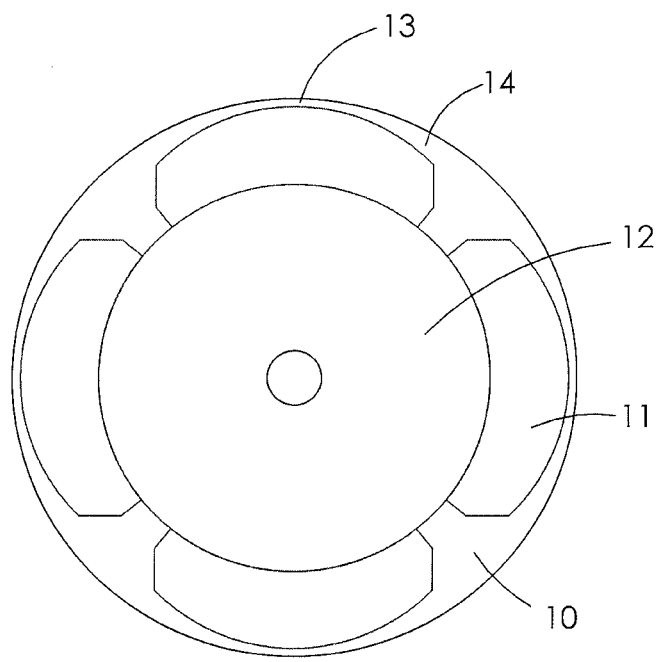
FIG. 6 is a view of a prior art rotor, as described herein before.

A rotor according to a second embodiment of the present invention is shown in FIG. 5. This Figure is similar to the view of FIG. 3. As can be seen, the receptacles for receiving the balancing material are in the form of holes 51. Holes 51 may be through holes which extend through the end ring. Alternatively, holes 51 may be blind holes, forming pockets for the balancing material, if required. Also, just visible within the receiving holes 28 of the rotor core are the ends of the protrusions 46. The protrusions 26 of this embodiment have a larger tapered end for greater ease of assembly.

In the present invention, the rotor 20 can be reliably assembled simply by inserting the rotor core 24 into the bracket 30 from the end ring side until the rotor core contacts the base and the protrusions are pressed into the receiving holes. The permanent magnets 26 are inserted into adjacent arms 34 of the bracket 30 from the base end, until they bear against the end ring 36.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet rotor comprising: a shaft; a rotor core fixed to the shaft; a bracket fixed to the rotor core; and a plurality of permanent magnets contacting an outer surface of the rotor core,
    wherein the bracket comprises a base at one axial end thereof, an end ring at the other axial end thereof, and a plurality of arms axially extending between the base and the end ring and spaced in a circumferential direction,
    the base has an opening for the insertion of the shaft,
    the rotor core is positioned between the arms,
    each magnet is sandwiched between two adjacent arms,
    an inner diameter of the end ring is greater than an outer diameter of the rotor core; and wherein the arms extend radially from a radially outermost surface of the base which faces away from the shaft.

2. The rotor of claim 1, wherein the bracket is an interference fit with the rotor core.

3. The rotor of claim 1, wherein at least one receiving hole is formed at one axial end of the rotor core, and at least one protrusion without extending axially through the base extends axially from a surface of the base facing the end ring and is arranged within the receiving hole as an interference fit.

4. The rotor of claim 3, wherein an annular recess is formed in the surface of the base about the root of each protrusion, and the annular recess does not extend axially through the base.

5. The rotor of claim 1, wherein at least one slot is defined along an inner edge of a surface of the end ring remote from the base.

6. The rotor of claim 1, wherein at least one hole is formed in the end ring.

7. The rotor of claim 1, wherein the base is an annular ring coaxial with the rotor core and a radially outermost diameter of the base is equal to an outer diameter of the rotor core.

8. The rotor of claim 1, wherein each arm comprises a first portion extending in a radial direction and a pair of second portions circumferentially and oppositely extending from a radially outer end of the first portion, each magnet being circumferentially positioned between the first portions of two adjacent arms and radially positioned between the outer surface of the rotor core and two opposing second portions of the two adjacent arms.

9. The rotor of claim 8, wherein the first portion extends radially beyond a radially inner surface of the end ring and is an interference fit with the outer surface of the rotor core.

10. The rotor of claim 1, wherein the arms do not extend radially beyond a radially outermost surface of the end ring which faces away from the shaft.

11. The rotor of claim 1, wherein the permanent magnets are adhered to the outer surface of the rotor core.

12. The rotor of claim 1, wherein the permanent magnets are arcuate in shape, a middle portion of each said magnet being thicker than circumferential ends of the magnet.

13. The rotor of claim 1, wherein the bracket is a monolithic plastic member.

14. The rotor of claim 1, wherein the end ring connects the aims at the other axial end of the bracket.

15. A permanent magnet rotor comprising: a shaft; a rotor core fixed to the shaft; a bracket fixed to the rotor core; and a plurality of permanent magnets contacting an outer surface of the rotor core,
    wherein the bracket comprises a base at one axial end thereof, an end ring at the other axial end thereof, and a plurality of arms axially extending between the base and the end ring and spaced in a circumferential direction,
    the base has an opening for the insertion of the shaft,
    the rotor core is positioned between the arms, each magnet is sandwiched between two adjacent arms,
the base is an annular ring coaxial with the rotor core;
a radially outermost diameter of the base is equal to an outer diameter of the rotor core; and
the arms extend radially from a radially outermost surface of the base which faces away from the shaft.

* * * * *